United States Patent [19]

Field et al.

[11] 3,865,863
[45] Feb. 11, 1975

[54] 2-(BENZOYL)-3-DIMETHYLAMINOACRYLONITRILES

[75] Inventors: George Francis Field, West Caldwell; Joachim Ulrich Schneider, West Paterson, both of N.J.

[73] Assignee: Hoffmann-La Roche Inc., Nutley, N.J.

[22] Filed: June 22, 1972

[21] Appl. No.: 265,117

[52] U.S. Cl............... 260/465 E, 71/88, 71/90, 71/95, 71/105, 260/240 R, 260/332.3 R, 260/347.8
[51] Int. Cl............................................. C07c 121/78
[58] Field of Search.................... 260/465 E; 71/105

[56] References Cited
UNITED STATES PATENTS

| | | | |
|---|---|---|---|
| 3,079,366 | 2/1963 | Boyle et al. | 260/465 X |
| 3,277,103 | 10/1966 | Trofimenko | 260/465 X |
| 3,656,932 | 4/1972 | Scheuermann et al. | 71/105 |

OTHER PUBLICATIONS

Huffman et al.: Chemical Abstracts, Vol. 57, pp. 828–829 (1962).

Primary Examiner—Lewis Gotts
Assistant Examiner—Dolph H. Torrence
Attorney, Agent, or Firm—Samuel L. Welt; Jon S. Saxe; Gerald S. Rosen

[57] ABSTRACT

Herbicidal compounds represented by the formula

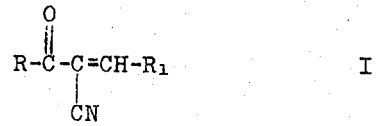

wherein R is phenyl, meta or ortho lower alkoxy phenyl, halophenyl, ortho nitrophenyl, meta or ortho lower alkyl phenyl, naphthyl, thienyl, furyl and di-lower alkyl phenyl with the proviso that the lower alkyl substituents are meta or ortho with respect to each other, $R_1$ is dimethylamino and pyrrolidyl useful as post-emergent and/or pre-emergent herbicides are disclosed.

12 Claims, No Drawings

2-(BENZOYL)-3-DIMETHYLAMINOACRYLONITRILES

BRIEF SUMMARY OF THE INVENTION

This invention relates to novel aminoacrylonitriles, herbicidal compositions containing them as active ingredients and methods for controlling plant growth with the novel compounds.

DETAILED DESCRIPTION OF THE INVENTION

The compounds of this invention are represented by the formula

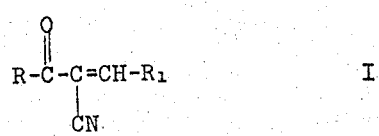

wherein R is phenyl, meta or ortho lower alkoxy phenyl, halophenyl, ortho nitrophenyl, meta or ortho lower alkyl phenyl, naphthyl, thienyl, furyl and di-lower alkyl phenyl with the proviso that the lower alkyl substituents are meta or ortho with respect to each other, and $R_1$ is dimethylamino and pyrrolidyl.

The compounds represented by formula I have post-emergent and/or pre-emergent herbicidal activity. However, the pre-emergent herbicidal activity is generally more significant. Compounds which have both post-emergent and pre-emergent herbicidal activity in micro-screening tests are those represented by the formula

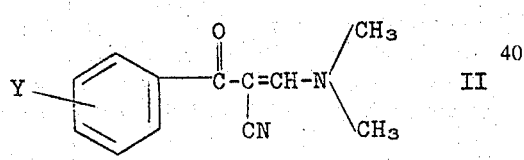

wherein Y is hydrogen, meta or ortho methyl, meta lower alkoxy, meta chloro, and meta iodo.

Compounds represented by formula I which have pre-emergent herbicidal activity with little or no post-emergent activity are those represented by the formula

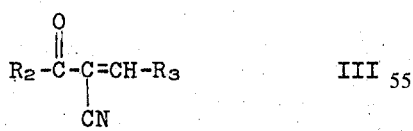

wherein $R_2$ is phenyl, naphthyl, meta or ortho lower alkoxy phenyl, meta methyl phenyl, ortho chlorophenyl, orthonitrophenyl, ortho fluorophenyl, parahalophenyl, meta-meta-dimethylphenyl and meta-ortho-dimethylphenyl, and $R_3$ is dimethylamino or pyrrolidyl.

Compounds represented by formula I which have post-emergent herbicidal activity are those represented by the formula

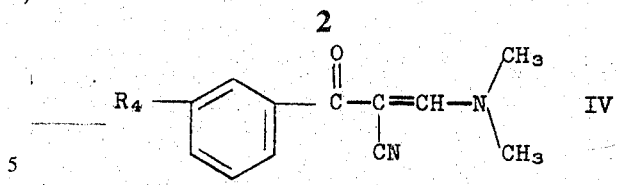

wherein $R_4$ is hydrogen, chloro or methoxy.

The most herbicidally active compounds represented by formula I are those which are active as pre-emergent herbicides when applied at a rate of about 2 pounds or less per acre. Compounds represented by formula I which have the preferred activity are represented by the formula

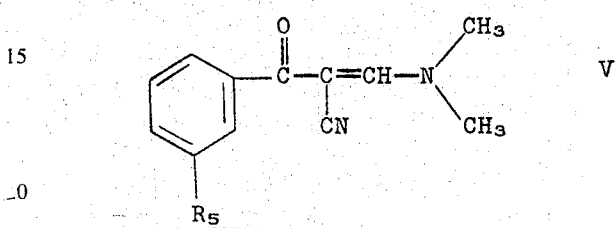

wherein $R_5$ is hydrogen or lower alkoxy.

As used herein, "lower alkoxy" includes both straight and branched chain groups containing from 1 to 6 carbon atoms, such as methoxy, ethoxy, n-propoxy, iso-propoxy, n-butoxy, and the like. The term "halo" includes chlorine, fluorine, bromine and iodine. "Lower alkyl" includes both straight and branched chain groups containing from 1 to 6 carbon atoms such as methyl, ethyl, n-propyl, iso-propyl, n-butyl and the like.

Representative of the compounds of this invention are:

2-Benzoyl-3-dimethylaminoacrylonitrile
2-(2-Methoxybenzoyl)-3-dimethylaminoacrylonitrile
2-(2-Chlorobenzoyl)-3-dimethylaminoacrylonitrile
2-(4-Chlorobenzoyl)-3-dimethylaminoacrylonitrile
2-(2-Nitrobenzoyl)-3-dimethylaminoacrylonitrile
2-(2-Toluoyl)-3-dimethylaminoacrylonitrile
2-(2-Fluorobenzoyl)-3-dimethylaminoacrylonitrile
2-(4-Bromobenzoyl)-3-dimethylaminoacrylonitrile
2-(3-Toluoyl)-3-dimethylaminoacrylonitrile
2-(3-Methoxybenzoyl)-3-dimethylaminoacrylonitrile
2-(1-Naphthoyl)-3-dimethylaminoacrylonitrile
2-(2-Furoyl)-3-dimethylaminoacrylonitrile
2-Benzoyl-3-pyrrolidinoacrylonitrile
2-(4-Fluorobenzoyl)-3-dimethylaminoacrylonitrile
2-(2-Thenoyl)-3-dimethylaminoacrylonitrile
2-(3-Chlorobenzoyl)-3-dimethylaminoacrylonitrile
2-(3-Iodobenzoyl)-3-dimethylaminoacrylonitrile
2-(2,3-Dimethylbenzoyl)-3-dimethylaminoacrylonitrile
2-(3,5-Dimethylbenzoyl)-3-dimethylaminoacrylonitrile
2-(3-Ethoxybenzoyl)-3-dimethylaminoacrylonitrile The compounds of this invention are useful in herbicide compositions for killing weeds as well as undesired plants which become inadvertently mixed in with the desired crops. While the compounds have post-emergent herbicidal activity, they are most useful when use for pre-emergent control. Pre-emergent control requires a smaller amount of the active compounds than does post-emergent control. In order to effect uniform distribution of the active compounds of the herbicidal compositions according to this invention, the compounds can be mixed with conventional pest control and herbicide adjuvants, modifiers, diluents or conditioning agents so that they may be formulated as solutions, emulsions, dispersions, dusts or wettable powders.

Liquid formulations of the active compounds according to the present invention for direct spraying may be made, for example, with water, petroleum fractions, liquid aliphatic or aromatic alcohols, esters, glycols or ketones and the like. These liquid formulations can be solutions, dispersions, emulsions or wettable powder dispersions and, if needed, may contain surface active agents, e.g., wetting agents, dispersing agents, emulsifying agents and the like, in sufficient amounts to impart the desired characteristics to the formulation.

Aqueous formulations, for example, can be made by adding water to emulsion concentrates, pastes or wettable spray powders of the active compounds. The wetting, emulsifying or dispersing agents may be either anionic, cationic, non-ionic or mixtures thereof. Suitable wetting agents are the organic compounds capable of lowering the surface tension of water and include the conventional soaps such as the water-soluble salts of long-chain carboxylic acids; the amine soaps, such as amine salts of long-chain carboxylic acids, the sulfonated animal, vegetable and mineral oils; quaternary salts of high molecular weight acids; rosin soaps such as salts of abietic acid, sulfuric acid salts of high molecular weight organic compounds; algin soaps; and simple and polymeric compositions having both hydrophobic and hydrophilic functions.

Dusts may be prepared by mixing or ginding of the active compound with a solid carrier material such as talc, diatomaceous earth, kaolin, bentonite, calcium carbonate, boric acid, calcium phosphate, wood, flour, cork, dust, carbon and the like. Scatterable granules may be obtained, for example, by using ammonium sulfate as carrier material. Alternatively, carrier materials may be impregnated with solutions of the active compounds in liquid solvents. Powder preparations or pastes which can be suspended in water and used as sprays may be obtained by adding wetting agents and protective colloids. Different forms of application may be better adapted to the various purposes for which the active compounds are to be used by the addition of substances which improve dispersion, adhesion, resistance to rain, and penetrative powder such as fatty acids, resins, wetting agents, emulsifying agents, glue and the like. Similarly, the biological spectrum may be broadened by the addition of substances having bactericidal, fungicidal and plant growth regulating properties and also by combination with fertilizers.

The amount of active ingredient in the herbicidal compositions of this invention varies according to the application rates, type of application and activity required. Generally, the compositions contain less than 50 percent active compound.

In order to obtain the greatest pre-emergence herbicidal activity, application rates of from 0.5 pound to 15 pounds or more per acre are required, based on the weight of the active compound. The greatest post-emergence herbicidal activity is obtained with application rates of from about 5 to 15 pounds or more per acre. It will be appreciated, of course, that all of the compounds represented by formulas I–V are not active against all of the crops and weeds. However, each of the active compounds within the scope of this invention is active against a specific crop or crops and a specific weed or weeds. As will be seen hereinafter, one advantage of this invention is that it provides a series of compositions which when applied to various crop and/or weed seeds supplies pre-emergence and post-emergence herbicidal activity of a wide spectrum of plants.

Herbicidal activity of the active compounds of the instant invention is exemplified in the following microscreen tests for post-emergence and pre-emergence effects.

Four weeds, crabgrass, johnson grass, mustard and pigweed, representative of broadleaf and narrow leaf species, sensitive and moderately tolerant to commercial herbicides are grown in a single square pot (4½ inches × 4½ inches). Weed species are seeded in separate clusters (about 40–50 seeds of each species) each occupying about ¼ of the pot. The seeds are pressed firmly into the soil and covered with one-eighth inch of sand.

The compounds are formulated into wettable powders, 0.5% by weight of a wetting agent, e.g., Tween 20 (polyoxyethylene sorbitan monostearate), Atlas Chemical Company is added to the wettable powder formulation. The formulation is applied to seeded pots, for pre-emergence tests and to pots containing weeds at different growth stages, for post-emergence tests, at a rate sufficient to provide 15 lb./acre of the compounds under test.

The treated pots are placed in a greenhouse and observed regularly for a period of two weeks after which time the test is terminated and the results evaluated.

The results of the tests are provided in Tables I and II wherein the herbicidal injury rating is set forth numerically. The ratings code is as follows: 0 — no visible effect; 1, 2, 3 — slight injury, plant usually recovered with little or no reduction in top growth; 4, 5, 6 — moderate injury, plants usually recovered, but with reduced top growth; 7, 8, 9 — severe injury, plants usually did not recover; 10 — all plants killed.

TABLE I

PRE-EMERGENCE HERBICIDAL ACTIVITY OF COMPOUNDS APPLIED AT 15 LBS./ACRE

| Compound | Crabgrass | Johnson Grass | Mustard | Pigweed |
| --- | --- | --- | --- | --- |
| 2-(2-Thenoyl)-3-dimethylaminoacrylonitrile | 10 | 6 | 10 | 10 |
| 2-(3-Iodobenzoyl)-3-dimethylaminoacrylonitrile | 9 | 2 | 10 | 10 |
| 2-(2,3-Dimethylbenzoyl)-3-dimethylaminoacrylonitrile | 8 | 2 | 9 | 4 |
| 2-(3,5-Dimethylbenzoyl)-3-dimethylaminoacrylonitrile | 9 | 3 | 9 | 5 |
| 2-(3-Ethoxybenzoyl)-3-dimethylaminoacrylonitrile | 10 | 8 | 10 | 10 |
| 2-(3-Chlorobenzoyl)-3-dimethylaminoacrylonitrile | 9 | 3 | 9 | 9 |
| 2-(2-Methoxybenzoyl)-3-dimethylaminoacrylonitrile | 7 | 3 | 9 | 10 |
| 2-(2-Chlorobenzoyl)-3-dimethylaminoacrylonitrile | 8 | 8 | 10 | 10 |
| 2-(4-Chlorobenzoyl)-3-dimethylaminoacrylonitrile | 4 | 6 | 2 | 9 |
| 2-(2-Nitrobenzoyl)-3-dimethylaminoacrylonitrile | 5 | 6 | 8 | 10 |
| 2-(2-Toluoyl)-3-dimethylaminoacrylonitrile | 10 | 9 | 10 | 10 |
| 2-(2-Fluorobenzoyl)-3-dimethylaminoacrylonitrile | 10 | 5 | 10 | 10 |
| 2-(4-Bromobenzoyl)-3-dimethylaminoacrylonitrile | 7 | 4 | 4 | 9 |
| 2-(3-Toluoyl)-3-dimethylaminoacrylonitrile | 10 | 8 | 10 | 10 |

TABLE I—Continued

PRE-EMERGENCE HERBICIDAL ACTIVITY OF COMPOUNDS APPLIED AT 15 LBS./ACRE

| Compound | Crabgrass | Johnson Grass | Mustard | Pigweed |
| --- | --- | --- | --- | --- |
| 2-(3-Methoxybenzoyl)-3-dimethylaminoacrylonitrile | 10 | 10 | 10 | 10 |
| 2-(1-Naphthoyl)-3-dimethylaminoacrylonitrile | 10 | 5 | 10 | 10 |
| 2-(2-Furoyl)-3-dimethylaminoacrylonitrile | 5 | 0 | 5 | 4 |
| 2-Benzoyl-3-pyrrolidinoacrylonitrile | 0 | 0 | 5 | 4 |
| 2-(4-Fluorobenzoyl)-3-dimethylaminoacrylonitrile | 0 | 0 | 9 | 5 |

TABLE II

POST-EMERGENCE HERBICIDAL ACTIVITY OF COMPOUNDS APPLIED AT 15 LBS./ACRE

| Compound | Crabgrass | Johnson Grass | Mustard | Pigweed |
| --- | --- | --- | --- | --- |
| 2-(2-Thenoyl)-3-dimethylaminoacrylonitrile | 0 | 0 | 10 | 5 |
| 2-(3-Iodobenzoyl)-3-dimethylaminoacrylonitrile | 0 | 0 | 8 | 7 |
| 2-(2,3-Dimethylbenzoyl)-3-dimethylaminoacrylonitrile | 0 | 0 | 0 | 0 |
| 2-(3,5-Dimethylbenzoyl)-3-dimethylaminoacrylonitrile | 0 | 0 | 0 | 0 |
| 2-(3-Ethoxybenzoyl)-3-dimethylaminoacrylonitrile | 5 | 6 | 9 | 9 |
| 2-(3-Chlorobenzoyl)-3-dimethylaminoacrylonitrile | 10 | 0 | 10 | 10 |
| 2-(2-Methoxybenzoyl)-3-dimethylaminoacrylonitrile | 0 | 0 | 5 | 5 |
| 2-(2-Chlorobenzoyl)-3-dimethylaminoacrylonitrile | 5 | 3 | 5 | 3 |
| 2-(4-Chlorobenzoyl)-3-dimethylaminoacrylonitrile | 9 | 3 | 3 | 3 |
| 2-(2-Nitrobenzoyl)-3-dimethylaminoacrylonitrile | 3 | 1 | 5 | 3 |
| 2-(2-Toluoyl)-3-dimethylaminoacrylonitrile | 0 | 5 | 9 | 9 |
| 2-(2-Fluorobenzoyl)-3-dimethylaminoacrylonitrile | 0 | 0 | 6 | 9 |
| 2-(4-Bromobenzoyl)-3-dimethylaminoacrylonitrile | 0 | 0 | 2 | 8 |
| 2-(3-Toluoyl)-3-dimethylaminoacrylonitrile | 4 | 4 | 9 | 9 |
| 2-(3-Methoxybenzoyl)-3-dimethylaminoacrylonitrile | 8 | 6 | 10 | 10 |
| 2-(1-Naphthoyl)-3-dimethylaminoacrylonitrile | 0 | 0 | 10 | 9 |
| 2-(2-Furoyl)-3-dimethylaminoacrylonitrile | 4 | 0 | 9 | 5 |
| 2-Benzoyl-3-pyrrolidinoacrylonitrile | 7 | 3 | 8 | 2 |
| 2-(4-Fluorobenzoyl)-3-dimethylaminoacrylonitrile | 10 | 2 | 10 | 9 |

The compounds generally have a chlorotic effect indicating that they interfere with the development of chlorophyll in the plants.

Pre-emergence and post-emergence herbicidal activity of the compounds of this invention at lesser concentrations than 15 lbs./acre were carried out using a variety of crop plants, annual weeds and perennial weeds.

For the pre-emergence tests the crop plant and weed species are seeded in individual disposable containers. The seeds are covered with sand.

For the post-emergence tests the crop plant and weed species are seeded by growth-time requirement schedules in individual disposable containers, watered as required and maintained in the greenhouse. When the crop plants and weeds reach the first true leaf stage, they are treated with the test compound.

The compounds of this invention were formulated into a suitable organic solvent and diluted with water containing wetting and emulsifying agents, e.g., Tween 20. The dilutions are such that when sprayed on the seeds or plants, the rate is 4, 2, 1 and 0.5 lbs./acre.

The results are observed for varying periods of time, usually from 2 weeks to 4 weeks and the results evaluated. The results of the tests are provided in Tables III and IV using the same herbicidal injury rating scale as in Tables I and II.

It will be noted from the data in the Tables that the compounds of this invention have selective post-emergence and pre-emergence herbicidal activity at various application rates.

The compounds of this invention may be prepared by alternative methods.

In one method an appropriately substituted aroylacetonitrile is reacted with a N,N-dimethylformamide di-lower alkyl acetal according to the following reaction scheme:

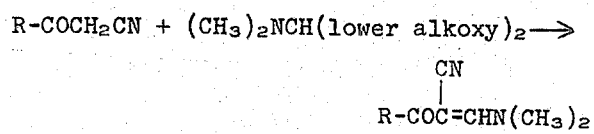

The reactants form a solution and the reaction takes place either without or with heating, depending on the specific reactants involved.

In another more preferred method 3-dimethylaminoacrylonitrile is aroylated according to the following reaction scheme:

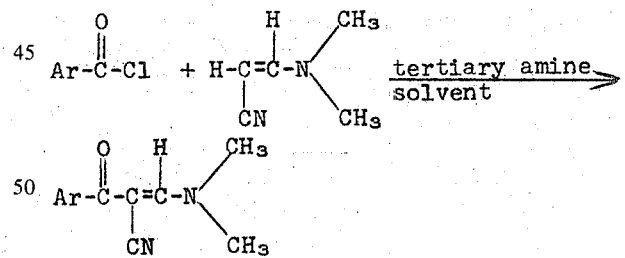

In order to prevent side reactions, it is necessary to conduct the reaction in a basic medium. Suitable bases have been found to be tertiary amines which are non-reactive with acyl halides under the conditions of the reaction, e.g., lower alkyl tertiary amines, pyridine and the like, preferably triethyl amine.

Suitable solvents are polar aprotic solvents which are inert under the conditions of the reaction. Typical of such solvents are tetrahydrofuran, methylene chloride, benzene and dioxane. The preferred solvent is dioxane.

The reaction is usually conducted at reflux temperatures and always under anhydrous conditions. It is necessary to have the conditions anhydrous to prevent interfering reactions.

TABLE III
PRE-EMERGENCE HERBICIDAL ACTIVITY

| Compound | Rate lbs./acre | Yellow Nut-sedge | Wild Oats | Jimson-weed | Velvet-leaf | Soy-bean | Johnson Grass | Pig-weed | Mus-tard | Yellow Foxtail | Cotton | Barn-yard Grass | Crab-grass | Cheat-grass | Wild Morning Glory | Peanut | Days |
|---|---|---|---|---|---|---|---|---|---|---|---|---|---|---|---|---|---|
| 2-Benzoyl-3-dimethylaminoacrylonitrile | 4 | 8 | 10 | 8 | 7 | 5 | 6 | 9 | 10 | 7 | 8 | 10 | 10 | 7 | 10 | 6 | 25 |
|  | 2 | 2 | 5 | 5 | 5 | 3 | 2 | 9 | 10 | 5 | 5 | 9 | 9 | 5 | 10 | 4 | 25 |
|  | 1 | 0 | 2 | 2 | 2 | 3 | 2 | 8 | 7 | 2 | 2 | 3 | 9 | 2 | 3 | 2 | 25 |
|  | 0.5 | 0 | 2 | 2 | 2 | 2 | 2 | 8 | 4 | 1 | 2 | 2 | 4 | 1 | 2 | 0 | 25 |
| 2-(2-Methoxybenzoyl)-3-dimethylaminoacrylonitrile | 4 | 4 | 5 | 6 | 6 | 7 | 2 | 9 | 9 | 2 | 7 | 4 | 7 | 4 | 8 | 3 | 19 |
|  | 2 | 2 | 4 | 2 | 2 | 4 | 2 | 8 | 7 | 0 | 3 | 3 | 3 | 2 | 4 | 1 | 19 |
|  | 1 | 0 | 2 | 2 | 2 | 3 | 2 | 2 | 6 | 0 | 1 | 0 | 2 | 0 | 2 | 0 | 19 |
|  | 0.5 | 0 | 0 | 2 | 0 | 1 | 0 | 2 | 6 | 0 | 1 | 0 | 0 | 0 | 2 | 0 | 19 |
| 2-(2-Chlorobenzoyl)-3-dimethylaminoacrylonitrile | 4 | 0 | 5 | 6 | 5 | 5 | 4 | 9 | 8 | 4 | 5 | 4 | 3 | 2 | 5 | 2 | 19 |
|  | 2 | 0 | 4 | 4 | 2 | 3 | 2 | 8 | 6 | 2 | 3 | 2 | 0 | 1 | 3 | 1 | 19 |
|  | 1 | 0 | 2 | 2 | 1 | 1 | 0 | 7 | 4 | 2 | 1 | 2 | 0 | 0 | 1 | 1 | 19 |
|  | 0.5 | 0 | 1 | 2 | 1 | 1 | 0 | 2 | 2 | 0 | 0 | 2 | 0 | 0 | 1 | 0 | 19 |
| 2-(2-Nitrobenzoyl)-3-dimethylaminoacrylonitrile | 4 | 2 | 2 | 5 | 4 | 3 | 3 | 0 | 4 | 2 | 4 | 4 | 5 | 3 | 5 | 2 | 19 |
|  | 2 | 0 | 2 | 3 | 2 | 1 | 1 | 0 | 2 | 2 | 2 | 2 | 2 | 1 | 3 | 2 | 19 |
|  | 1 | 0 | 0 | 1 | 0 | 0 | 0 | 0 | 1 | 0 | 2 | 1 | 0 | 1 | 3 | 0 | 19 |
|  | 0.5 | 0 | 0 | 1 | 0 | 0 | 0 | 0 | 1 | 0 | 2 | 0 | 0 | 0 | 0 | 0 | 19 |
| 2-(2-Toluoyl)-3-dimethylaminoacrylonitrile | 4 | 5 | 4 | 5 | 6 | 4 | 3 | 9 | 9 | 6 | 7 | 4 | 9 | 3 | 6 | 4 | 19 |
|  | 2 | 1 | 2 | 2 | 4 | 4 | 3 | 9 | 7 | 4 | 5 | 2 | 5 | 1 | 4 | 2 | 19 |
|  | 1 | 1 | 2 | 1 | 3 | 3 | 1 | 7 | 5 | 4 | 3 | 2 | 0 | 1 | 2 | 0 | 19 |
|  | 0.5 | 0 | 1 | 1 | 1 | 2 | 0 | 2 | 4 | 0 | 3 | 1 | 0 | 0 | 1 | 0 | 19 |
| 2-(2-Fluorobenzoyl)-3-dimethylaminoacrylonitrile | 4 | 3 | 3 | 5 | 5 | 1 | 3 | 9 | 8 | 4 | 7 | 4 | 9 | 3 | 5 | 4 | 19 |
|  | 2 | 1 | 1 | 3 | 3 | 1 | 1 | 7 | 6 | 2 | 3 | 2 | 3 | 2 | 3 | 2 | 19 |
|  | 1 | 0 | 1 | 1 | 1 | 1 | 0 | 7 | 4 | 0 | 1 | 1 | 3 | 0 | 3 | 1 | 19 |
|  | 0.5 | 0 | 1 | 1 | 1 | 0 | 0 | 4 | 2 | 0 | 1 | 1 | 0 | 0 | 1 | 0 | 19 |
| 2-(4-Bromobenzoyl)-3-dimethylaminoacrylonitrile | 4 | 1 | 2 | 3 | 5 | 0 | 1 | 5 | 4 | 4 | 1 | 4 | 7 | 1 | 3 | 1 | 19 |
|  | 2 | 0 | 2 | 1 | 3 | 0 | 1 | 2 | 1 | 2 | 1 | 2 | 2 | 0 | 1 | 0 | 19 |
|  | 1 | 0 | 1 | 1 | 1 | 0 | 0 | 2 | 0 | 0 | 1 | 1 | 1 | 0 | 0 | 0 | 19 |
|  | 0.5 | 0 | 0 | 1 | 1 | 0 | 0 | 2 | 0 | 0 | 1 | 1 | 0 | 0 | 0 | 0 | 19 |
| 2-(3-Toluoyl)-3-dimethylaminoacrylonitrile | 4 | 7 | 4 | 5 | 9 | 4 | 3 | 8 | 8 | 5 | 3 | 3 | 8 | 4 | 7 | 3 | 19 |
|  | 2 | 1 | 2 | 2 | 2 | 1 | 1 | 7 | 5 | 2 | 1 | 1 | 6 | 1 | 2 | 0 | 19 |
|  | 1 | 1 | 0 | 1 | 1 | 0 | 0 | 3 | 3 | 0 | 1 | 1 | 1 | 0 | 0 | 0 | 19 |
|  | 0.5 | 0 | 0 | 1 | 1 | 0 | 0 | 2 | 1 | 0 | 0 | 1 | 1 | 0 | 0 | 0 | 19 |
| 2-(3-Methoxybenzoyl)-3-dimethylaminoacrylonitrile | 4 | 9 | 9 | 8 | 10 | 8 | 4 | 10 | 9 | 8 | 9 | 10 | 10 | 7 | 9 | 5 | 20 |
|  | 2 | 4 | 5 | 5 | 5 | 6 | 3 | 10 | 8 | 5 | 3 | 4 | 9 | 3 | 7 | 3 | 20 |
|  | 1 | 1 | 2 | 3 | 1 | 3 | 1 | 7 | 5 | 1 | 1 | 2 | 5 | 1 | 1 | 1 | 20 |
|  | 0.5 | 1 | 2 | 1 | 1 | 3 | 0 | 7 | 5 | 1 | 1 | 1 | 5 | 1 | 1 | 1 | 20 |
| 2-(1-Naphthoyl)-3-dimethylaminoacrylonitrile | 4 | 1 | 3 | 5 | 3 | 3 | 3 | 10 | 8 | 3 | 3 | 3 | 9 | 4 | 5 | 1 | 20 |
|  | 2 | 0 | 1 | 1 | 1 | 0 | 1 | 5 | 1 | 0 | 1 | 1 | 1 | 1 | 1 | 0 | 20 |
|  | 1 | 0 | 0 | 0 | 0 | 1 | 0 | 5 | 1 | 0 | 1 | 1 | 0 | 0 | 0 | 0 | 20 |
|  | 0.5 | 0 | 0 | 0 | 0 | 0 | 0 | 3 | 1 | 0 | 1 | 1 | 0 | 0 | 0 | 0 | 20 |
| 2-(2-Furoyl)-3-dimethylaminoacrylonitrile | 4 | 2 | 1 | 1 | 2 | 1 | 1 | 3 | 3 | 0 | 3 | 3 | 2 | 2 | 1 | 0 | 20 |
|  | 2 | 0 | 0 | 0 | 0 | 0 | 0 | 1 | 1 | 0 | 1 | 1 | 0 | 0 | 1 | 0 | 20 |
|  | 1 | 0 | 0 | 0 | 0 | 0 | 0 | 0 | 0 | 0 | 1 | 1 | 0 | 0 | 1 | 0 | 20 |
|  | 0.5 | 0 | 0 | 0 | 0 | 0 | 0 | 0 | 0 | 0 | 1 | 1 | 0 | 0 | 1 | 0 | 20 |

TABLE III—Continued

PRE-EMERGENCE HERBICIDAL ACTIVITY

| Compound | Rate lbs./acre | Yellow Nutsedge | Wild Oats | Jimsonweed | Velvetleaf | Soybean | Johnson Grass | Pigweed | Mustard | Yellow Foxtail | Cotton | Barnyard Grass | Crabgrass | Cheatgrass | Wild Morning Glory | Peanut | Days |
|---|---|---|---|---|---|---|---|---|---|---|---|---|---|---|---|---|---|
| 2-(3-Ethoxybenzoyl)-3-dimethylaminoacrylonitrile | 4 | 8 | 8 | 9 | 9 | 6 | 6 | 10 | 9 | 9 | 5 | 8 | 10 | 9 | 4 | 3 | 20 |
|  | 2 | 6 | 7 | 8 | 8 | 3 | 4 | 10 | 5 | 6 | 3 | 5 | 10 | 8 | 2 | 1 | 20 |
|  | 1 | 0 | 4 | 8 | 3 | 3 | 3 | 9 | 4 | 3 | 2 | 3 | 9 | 3 | 1 | 0 | 20 |
|  | 0.5 | 0 | 3 | 2 | 2 | 2 | 2 | 5 | 2 | 1 | 0 | 2 | 8 | 1 | — | 0 | 20 |

TABLE IV

POST-EMERGENCE HERBICIDAL ACTIVITY

| Compound | Rate lbs./acre | Yellow Nutsedge | Wild Oats | Jimsonweed | Pigweed | Johnson Grass | Hedge Bindweed | Mustard | Yellow Foxtail | Barnyard Grass | Crabgrass | Cotton | Wild Morning Glory | Days |
|---|---|---|---|---|---|---|---|---|---|---|---|---|---|---|
| 2-Benzoyl-3-dimethylaminoacrylonitrile | 4 | 2 | 5 | 7 | 10 | 1 | 2 | 9 | 2 | 3 | 1 | 5 | 5 | 14 |
| 2-(2-Methoxybenzoyl)-3-dimethylaminoacrylonitrile | 4 | 0 | 1 | 2 | 1 | 0 | 2 | 4 | 1 | 0 | 0 | 2 | 3 | 14 |
| 2-(2-Chlorobenzoyl)-3-dimethylaminoacrylonitrile | 4 | 1 | 2 | 2 | 4 | 2 | 2 | 2 | 1 | 2 | 2 | 1 | 2 | 14 |
| 2-(2-Nitrobenzoyl)-3-dimethylaminoacrylonitrile | 4 | 2 | 2 | 1 | 6 | 2 | 2 | 2 | 2 | 2 | 0 | 2 | 2 | 14 |
| 2-(2-Toluoyl)-3-dimethylaminoacrylonitrile | 4 | 2 | 3 | 3 | 5 | 0 | 0 | 4 | 0 | 2 | 0 | 4 | 3 | 14 |
| 2-(2-Fluorobenzoyl)-3-dimethylaminoacrylonitrile | 4 | 1 | 3 | 4 | 7 | 2 | 3 | 6 | 4 | 3 | 0 | 4 | 3 | 14 |
| 2-(4-Bromobenzoyl)-3-dimethylaminoacrylonitrile | 4 | 0 | 3 | 2 | 0 | 0 | 0 | 1 | 2 | 0 | 0 | 3 | 1 | 14 |
| 2-Benzoyl-3-dimethylaminoacrylonitrile | 4 | 2 | 5 | 7 | 10 | 1 | 2 | 9 | 2 | 3 | 1 | 5 | 5 | 14 |
| 2-(2-Methoxybenzoyl)-3-dimethylaminoacrylonitrile | 4 | 0 | 1 | 2 | 0 | 1 | 2 | 4 | 1 | 0 | 0 | 2 | 3 | 14 |
| 2-(2-Chlorobenzoyl)-3-dimethylaminoacrylonitrile | 4 | 1 | 2 | 2 | 4 | 2 | 2 | 2 | 1 | 2 | 2 | 1 | 2 | 14 |
| 2-(2-Nitrobenzoyl)-3-dimethylaminoacrylonitrile | 4 | 2 | 2 | 3 | 6 | 2 | 0 | 4 | 2 | 2 | 2 | 4 | 4 | 14 |
| 2-(2-Toluoyl)-3-dimethylaminoacrylonitrile | 4 | 0 | 3 | 4 | 5 | 0 | 3 | 6 | 4 | 3 | 0 | 3 | 3 | 14 |
| 2-(2-Fluorobenzoyl)-3-dimethylaminoacrylonitrile | 4 | 0 | 3 | 2 | 7 | 1 | 0 | 5 | 3 | 3 | 1 | 2 | 2 | 14 |
| 2-(4-Bromobenzoyl)-3-dimethylaminoacrylonitrile | 4 | 4 | 2 | 4 | 2 | 0 | 4 | 8 | 5 | 2 | 2 | 4 | 4 | 14 |
| 2-(3-Toluoyl)-3-dimethylaminoacrylonitrile | 4 | 0 | 1 | 1 | 0 | 0 | 0 | 2 | 1 | 1 | 0 | 0 | 1 | 14 |
| 2-(3-Methoxybenzoyl)-3-dimethylaminoacrylonitrile | 4 | 4 | 2 | 1 | 0 | 0 | 1 | 1 | 1 | 0 | 0 | 0 | 1 | 14 |
| 2-(1-Naphthoyl)-3-dimethylaminoacrylonitrile | 4 | 0 | 2 | 1 | 1 | 0 | 1 | 2 | 1 | 1 | 0 | 0 | 4 | 14 |
| 2-(2-Furoyl)-3-dimethylaminoacrylonitrile | 4 | 5 | 5 | 5 | 9 | 3 | 2 | 9 | 5 | 4 | 5 | 7 | 3 | 14 |

In some cases the reaction may occur without heating, however, the usual procedures required heating at reflux.

If it is desired to replace the dimethyl amino substituent with another amino group, e.g., pyrrolidine, the final products can be reacted with the other amino group in an aromatic solvent, such as benzene, xylene or toluene. The reaction is most successful where the replacement amine is less volatile than dimethylamine.

The following examples illustrate the invention.

EXAMPLE 1

2-Benzoyl-3-dimethylaminoacrylonitrile

A solution of 18.5 grams of benzoylacetonitrile in 70 ml. of N,N-dimethylformamide diethylacetal was heated under reflux for 24 hours. The resulting solution was concentrated to dryness under reduced pressure. The resulting brown solid was crystallized from 50 ml. of methanol and recrystallized from 70 ml. of methanol resulting in pale yellow prisms, m.p. 109°–111°C.

EXAMPLE 2

2(3-Chlorobenzoyl)-3-dimethylaminoacrylonitrile

A mixture of 21.9 g. (125 mmol) of 3-chlorobenzoyl chloride, 9.6 g. (100 mmol) of 3-dimethylaminoacrylonitrile, 15.2 g. (150 mmol) of triethylamine in 100 ml. of anhydrous dioxane was refluxed for 6 hours. After standing overnight at room temperature, the reaction mixture was evaporated to dryness and taken up in 200 ml. of methylene chloride. The resulting solution was washed with 200 ml. of water, 200 ml. 3N aqueous NaOH, 200 ml. 3N aqueous HCl and 200 ml. water. The resulting solution was dried over anhydrous sodium sulfate and then evaporated. The resulting oil was diluted with 20 ml. of ether and crystallized in a dry ice/acetone mixture. The product was recrystallized from methanol/ether to yield pale yellow prisms, m.p. 81°–82°.

EXAMPLE 3

2-Benzoyl-3-dimethylaminoacrylonitrile

A mixture of 96.1 grams (1 mol) of 3-dimethylaminoacrylonitrile, 500 ml. of anhydrous dioxane, 211 grams (1.5 mol) of benzoyl chloride and 202.4 grams (2 mol) of triethylamine was placed in a 2 liter reaction flask. The mixture was stirred and refluxed under nitrogen for 24 hours, then evaporated to a solid. The solid was dissolved in 1 liter of methylene chloride, washed with 500 ml. of water, twice with 500 ml. 2N aqueous NaOH and then with water. The resulting organic layer was dried over 200 grams of anhydrous sodium sulfate, filtered and evaporated to a crystalline residue which was treated with 200 ml. of methanol and collected in a sintered glass funnel. The resulting residue was washed with 100 ml. methanol, 100 ml. of a 1:1 mixture of methanol and ether, then 100 ml. ether to yield light yellow prisms, m.p. 111.5°–112.5°. The filtrate was evaporated to dryness and the residue treated with 100 ml. of methanol, cooled and the solids collected. After washing with several portions of methanol and ether, pale green prisms, m.p. 111.5°–112.5°C. were obtained. The two crops of product were combined and recrystallized from 500 ml. of methanol to yield almost colorless prisms, m.p. 111.5°–112.5°.

The following Table indicates the compounds made by following the procedure of Example 3 but replacing benzoyl chloride with an equivalent amount of the noted aroyl chlorides and utilizing the noted crystallization medium.

| Example | Aroyl Chloride | Product | Crystallization Medium | Appearance | M.P. °C. |
|---|---|---|---|---|---|
| 4 | 2-toluoyl chloride | 2-(2-toluoyl)-3-dimethylaminoacrylonitrile | $CH_3OH$/ether | pale yellow clusters | 108.5–109° |
| 5 | 3-toluoyl chloride | 2-(3-toluoyl)-3-dimethylaminoacrylonitrile | $CH_3OH$/ether | pale yellow prisms | 97–98° |
| 6 | 2-methoxybenzoyl chloride | 2-(2-methoxybenzoyl)-3-dimethylaminoacrylonitrile | $CH_3OH$/ether | pale yellow clusters | 120–123° |
| 7 | 3-methoxybenzoyl chloride | 2-(3-methoxybenzoyl)-3-dimethylaminoacrylonitrile | $CH_3OH$ | colorless rods | 78.5–79° |
| 8 | 2-fluorobenzoyl chloride | 2-(2-fluorobenzoyl)-3-dimethylaminoacrylonitrile | $CH_3OH$/ether | almost colorless needles | 87.5–89.5° |
| 9 | 4-fluorobenzoyl chloride | 2-(4-fluorobenzoyl)-3-dimethylaminoacrylonitrile | $CH_3OH$ | colorless prisms | 151.5–152.5° |
| 10 | 4-chlorobenzoyl chloride | 2-(4-chlorobenzoyl)3-dimethylaminoacrylonitrile | $CHCl_3$/$CH_3OH$ | colorless plates | 119–121° |
| 11 | 2-chlorobenzoyl chloride | 2-(2-chlorobenzoyl)-3-dimethylaminoacrylonitrile | $CHCl_3$/$CH_3OH$ | light pink platelets | 129–131° |
| 12 | 4-bromobenzoyl chloride | 2-(4-bromobenzoyl)3-dimethylaminoacrylonitrile | $CH_3OH$/ether | pale yellow prisms | 140–141.5° |
| 13 | 2-nitrobenzoyl chloride | 2-(2-nitrobenzoyl)-3-dimethylaminoacrylonitrile | $CHCl$/$CH_3OH$ | yellow prisms | 154–154.5° |
| 14 | Naphthoyl chloride | 2-(1-naphthoyl)-3-dimethylaminoacrylonitrile | $CH_3OH$/ether | tan prisms | 131.5–133° |

EXAMPLE 15

2-(2-furoyl)-3-dimethylaminoacrylonitrile

A mixture of 19.2 grams (200 mmol) of 3-dimethylaminoacrylonitrile, 200 ml. of anhydrous dioxane, 39.15 (300 mmol) of 2-furoyl chloride and 40.4 grams (400 mmol) of triethylamine was stirred at reflux for 24 hours in a flask fitted with a condenser and drying tube. The reaction mixture was evaporated, the resulting residue treated with ice and water and collected in a sintered glass funnel. The resulting solid was washed with water, 50% aqueous methanol and then ether to yield greenish needles. Recrystallization from a mixture of methylene chloride and methanol, then recrystallization from methanol yielded pale green-yellow needles, m.p. 148°–149°.

EXAMPLE 16

2-(2-Thenoyl)-3-dimethylaminoacrylonitrile 2-(2-Thenoyl)-3-dimethylaminoacrylonitrile was prepared by the procedure of Example 15 by replacing 2-furoyl chloride with an equivalent amount of 2- thenoyl chloride. The resulting product was gray white needles melting at 148°–151°C.

EXAMPLE 17

2(3-Iodobenzoyl)-3-dimethylaminoacrylonitrile 2-(3-Iodobenzoyl)-3-dimethylaminoacrylonitrile was prepared by the procedure of Example 15 by replaacing 2-furoyl chloride with an equivalent amount of 3-iodobenzoyl chloride. The resulting product was off-white prisms melting at 110°–111°C.

EXAMPLE 18

2(3-Ethoxybenzoyl)-3-dimethylaminoacrylonitrile 2-(3-Ethoxybenzoyl)-3-dimethylaminoacrylonitrile was prepared by the procedure of Example 15 by replacing 2-furoyl chloride with an equivalent amount of 3-ethoxybenzoyl chloride. The resulting product was tan needles melting at 74°–75°C.

EXAMPLE 19

2-(2,3-Dimethylbenzoyl)-3-dimethylaminoacrylonitrile 2-(2,3-Dimethylbenzoyl)-3-dimethylaminoacrylonitrile was prepared by the procedure of Example 15 by replacing 2-furoyl chloride with an equivalent amount of 2,3-dimethylbenzoyl chloride. The resulting product was tan prisms melting at 171°–173°C.

EXAMPLE 20

2-(3,5-Dimethylbenzoyl)-3-dimethylaminoacrylonitrile 2-(3,5-Dimethylbenzoyl)-3-dimethylaminoacrylonitrile was prepared by the procedure of Example 15 by replacing 2-furoyl chloride with an equivalent amount of 3,5-dimethylbenzoyl chloride. The resulting product was pale yellow prisms melting at 117°–119°C.

EXAMPLE 21

2-Benzoyl-3-pyrrolidinoacrylonitrile

A mixture of 50 mmols of 2-benzoyl-3-dimethylaminoacrylonitrile, 20 ml. of pyrrolidine and 200 ml. of toluene was refluxed for 2 hours in a 500 ml. reaction flask. The reaction mixture was evaporated almost to dryness, ether was added and the crystalline material was collected. The resulting product was recrystallized from methanol to yield yellow clusters melting at 88°–88.5°.

EXAMPLE 22

3-Dimethylaminoacrylonitrile 173.0 G. of the diethylacetal of dimethylformamide (1.18 moles) and 400 ml. of acetonitrile were placed in a 1200 ml. autoclave. Air was removed from the autoclave by flushing with nitrogen, and after purging charged to 50 p.s.i. with nitrogen. The reaction was carried out for 36 hours at 150°C. Upon completion of the reaction, excess acetonitrile was removed by vacuum distillation using a rotary evaporator at a vacuum of 135 mm Hg. and a waterbath temperature of 60°C. maximum. The remaining residue was fractionated using a 24-inch Vigreaux column. After discarding a small first fraction, the material boiling at 115°C. and 3.0 mm Hg. was collected. This material was 3-dimethylaminoacrylonitrile.

We claim:
1. 2-(2-methoxybenzoyl)-3-dimethylaminoacrylonitrile.
2. 2-(2-chlorobenzoyl)-3-dimethylaminoacrylonitrile.
3. 2-(4-chlorobenzoyl)-3-dimethylaminoacrylonitrile.
4. 2-(2-nitrobenzoyl)-3-dimethylaminoacrylonitrile.
5. 2-(2-fluorobenzoyl)-3-dimethylaminoacrylonitrile.
6. 2-(4-bromobenzoyl)-3-dimethylaminoacrylonitrile.
7. 2-(3-methoxybenzoyl)-3-dimethylaminoacrylonitrile.
8. 2-(1-naphthoyl)-3-dimethylaminoacrylonitrile.
9. 2-(4-fluorobenzoyl)-3-dimethylaminoacrylonitrile.
10. 2-(3-chlorobenzoyl)-3-dimethylaminoacrylonitrile.
11. 2-(3-iodobenzoyl)-3-dimethylaminoacrylonitrile.
12. 2-(3-ethoxybenzoyl)-3-dimethylaminoacrylonitrile.

* * * * *